(12) United States Patent
Zhang

(10) Patent No.: US 9,817,171 B2
(45) Date of Patent: Nov. 14, 2017

(54) LIGHT GUIDE PLAT AND BACKLIGHT MODULE HAVING THE SAME

(71) Applicant: Wuhan China Star Optoelectronics Technology Co., Ltd., Wuhan, Hubei (CN)

(72) Inventor: Yanxue Zhang, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 195 days.

(21) Appl. No.: 14/778,264

(22) PCT Filed: Aug. 13, 2015

(86) PCT No.: PCT/CN2015/086897
§ 371 (c)(1),
(2) Date: Sep. 18, 2015

(87) PCT Pub. No.: WO2017/024592
PCT Pub. Date: Feb. 16, 2017

(65) Prior Publication Data
US 2017/0038516 A1    Feb. 9, 2017

(30) Foreign Application Priority Data
Aug. 7, 2015 (CN) .......................... 2015 1 0483938

(51) Int. Cl.
*F21V 8/00* (2006.01)
(52) U.S. Cl.
CPC ........... *G02B 6/002* (2013.01); *G02B 6/0016* (2013.01); *G02B 6/0038* (2013.01); *G02B 6/0061* (2013.01)
(58) Field of Classification Search
CPC ... G02B 6/0061; G02B 6/0038; G02B 6/0046
See application file for complete search history.

(56) References Cited

U.S. PATENT DOCUMENTS

2011/0286237 A1* 11/2011 Tanoue ............... G02B 6/0016
                                                          362/606
2013/0242231 A1*  9/2013 Kurata ............... G02B 6/0016
                                                          349/65
(Continued)

FOREIGN PATENT DOCUMENTS

CN         1743912 A      3/2006
CN       102900996 A      1/2013
(Continued)

OTHER PUBLICATIONS

Search Report, International Search Report.

*Primary Examiner* — Elmito Breval
(74) *Attorney, Agent, or Firm* — Andrew C. Cheng

(57) ABSTRACT

A light guide plate includes a plate body and a wedge-shaped body extended upward along a terminal of the plate body. A top surface of the plate body is connected smoothly with an inclined surface of the wedge-shaped body. The inclined surface is provided with multiple first inclined V-shaped structures arranged at intervals, and the top surface is provided with multiple first vertical V-shaped structures. The present invention also provides a backlight module having the light guide plate. When a light source is right opposite to a first spaced region (or a second spaced region) corresponding to and located between two first inclined V-shaped structures (or two second inclined V-shaped structures), lights emitted from the light source can be uniformed by the first inclined V-shaped structure and the second inclined V-shape structure in order to eliminate an uneven light and dark phenomenon generated on the inclined surface.

9 Claims, 4 Drawing Sheets

(56) References Cited

U.S. PATENT DOCUMENTS

2014/0132887 A1* 5/2014 Kurata ............... G02B 6/0018
349/65
2014/0176874 A1* 6/2014 Shinohara .............. G02B 6/002
349/65
2014/0176875 A1* 6/2014 Shinohara ............ G02B 6/0016
349/65

FOREIGN PATENT DOCUMENTS

| CN | 103901528 A | 7/2014 |
|----|-------------|--------|
| JP | 2014130748 A | 7/2014 |

* cited by examiner

LIGHT GUIDE PLAT AND BACKLIGHT MODULE HAVING THE SAME

BACKGROUND OF THE INVENTION

1. Field of the Invention

The present invention relates to a liquid crystal display technology field, and more particularly to a light guide plate and a backlight module having the same.

2. Description of Related Art

A liquid crystal display (LCD) is widely applied in the notebook computer field, the automotive display field, the mobile phone field, and so on because of small size, light weight and brightness uniformity.

A backlight module of an LCD is an optical structure that can convert distributed point light sources or linear light sources into an even surface light source. Along with the technology development of an LCD, a big screen and a high screen size occupied ratio become one of the important development trends. In an LCD, a high screen size occupied ratio means that a distance between a light source and a viewing region is reduced. However, an uneven light and dark (hotspot) phenomenon will be generated at a light incident side of the backlight module.

SUMMARY OF THE INVENTION

In order to solve the above problems in the conventional art, an object of the present invention is to provide a light guide plate, comprising: a plate body having a top surface; a wedge-shaped body having an inclined surface, and extended upward along a terminal of the plate body; wherein, the top surface of the plate body is connected smoothly with the inclined surface of the wedge-shaped body, the inclined surface is provided with multiple first inclined V-shaped structures arranged at intervals, and the top surface is provided with multiple first vertical V-shaped structures.

Wherein, the first inclined V-shaped structures include multiple first protrusion blocks extended along a first direction and multiple second protrusion blocks extended along a second direction, and the first direction and the second direction are intersected.

Wherein, the first vertical V-shaped structures include multiple third protrusion blocks extended along a third direction, and the third direction pass through an intersection point of the first direction and the second direction.

Wherein, the third protrusion blocks corresponding to a first spaced region located between the first inclined V-shaped structures are extended to the first spaced region.

Wherein, a first spaced region located between the first inclined V-shaped structures is provided with multiple second dots.

Wherein, a bottom surface of the wedge-shaped body has multiple second inclined V-shaped structures arranged at intervals, and a bottom surface of the plate body has second vertical V-shaped structures.

Wherein, the second inclined V-shaped structures include multiple fourth protrusion blocks extended along the first direction and multiple fifth protrusion blocks extended along the second direction, and the first direction and the second direction are intersected.

Wherein, the second vertical V-shaped structures include multiple sixth protrusion blocks extended along the third direction, and the third direction pass through an intersection point of the first direction and the second direction.

Wherein, a second spaced region located between the second inclined V-shaped structures is provided with multiple first dots.

Another object of the present invention is to provide a backlight module having the above light guide plate.

The beneficial effects of the present invention: the inclined surface is provided with a first inclined V-shaped structure, and the first surface of the reflection surface is provided with a second inclined V-shaped structure. The light source is disposed right oppositely to the first spaced region (or the second spaced region) located between two corresponding first inclined V-shaped structures (or two corresponding second V-shaped structures). By above way, the lights emitted from the light source can be evenly distributed by the first inclined V-shaped structures and the second inclined V-shaped structures. At the same time, black ink dots are provided at the second spaced region located between the second V-shaped structures so as to increase the light intensity at a front emitting region of the light source. Accordingly, an uneven light and dark phenomenon generated on the inclined surface can be eliminated.

DETAILED DESCRIPTION OF THE PREFERRED EMBODIMENT

The following content combines figures and embodiments for detail description of the present invention.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

Figure 1:
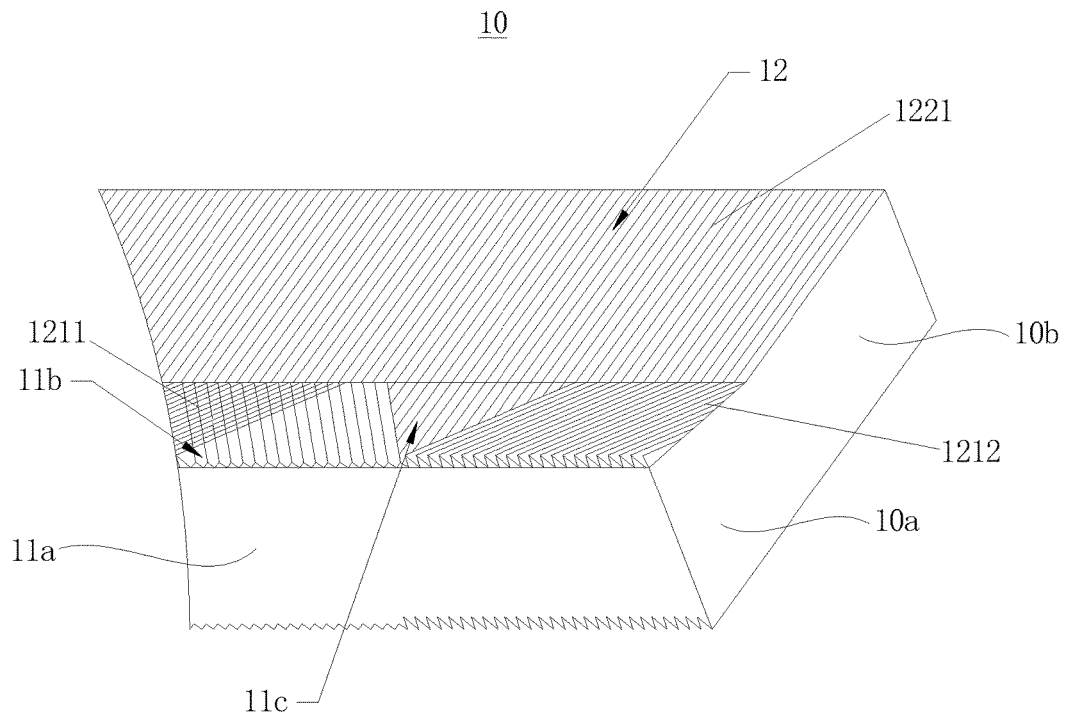
FIG. 1 is a partial three-dimensional view of a light guide plate according to an embodiment of the present invention.
Figure 2:
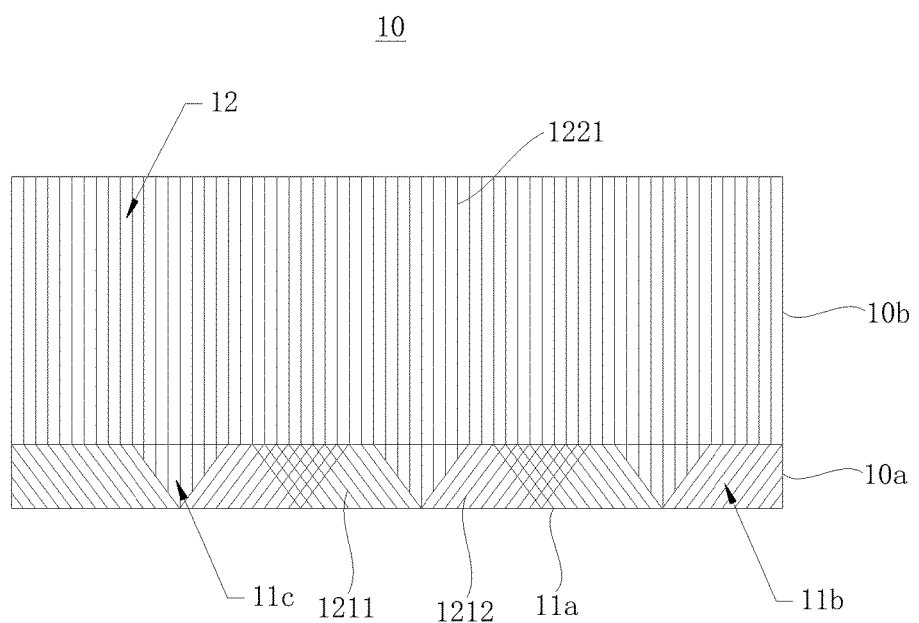
FIG. 2 is a top view of a light guide plate according to an embodiment of the present invention.

FIG. 1 is a partial three-dimensional view of a light guide plate according to an embodiment of the present invention. FIG. 2 is a top view of a light guide plate according to an embodiment of the present invention.

With reference to FIG. 1 and FIG. 2, a light guide plate of the present invention is wedge-shaped. Specifically, the light guide plate 10 includes a plate body 10a and a wedge-shaped body 10b extended upward along a terminal of the plate body 10a. Wherein, a thicker terminal surface of the wedge-shaped body 10b is a light incident surface 11a. A thinner terminal surface of the wedge-shaped body 10b is smoothly connected with the plate body 10a. An upper surface of the plate body 10a is a light emitting surface 12. An inclined surface 11b of the wedge-shaped body 10b is connected with the upper surface (the light emitting surface 12) of the plate body 10a. Multiple first inclined V-shaped structures are arranged at intervals on the inclined surface 11b of the wedge-shapes body 10b. Multiple first vertical V-shaped structures are formed on the light emitting surface 12.

In the present embodiment, the light guide plate 10 is made of a synthetic resin material for a general light guide plate such as polycarbonate (PC), polymethyl methacrylate (PMMA), or acrylic.

With reference to FIG. 1 and FIG. 2, the first inclined V-shaped structure formed on the first inclined surface 11b Includes Multiple First Protrusion Blocks 1211 extended along a first direction and multiple second protrusion blocks 1212 extended along a second direction. Wherein, the first direction and the second direction are intersected. It should be noted that an included angle between the first direction and a normal direction of the light incident surface 11 is an acute angle, and an included angle between the second direction and the normal direction of the light incident surface 11 is an acute angle.

Furthermore, the included angle between the first direction and the normal direction of the light incident surface 11 is equal to the included angle between the second direction and the normal direction of the light incident surface 11. That is, the normal direction of the light incident surface 11 is a symmetric axis of the first direction and the second direction.

With further reference to FIG. 1 and FIG. 2, the first vertical V-shaped structures arranged at intervals on the light emitting surface 12 include multiple third protrusion blocks 1221 extended along a third direction. Wherein, the third direction is in parallel with the normal direction of the light incident surface 11.

Furthermore, the third protrusion blocks 1221 corresponding to a first spaced region 11c located between the first inclined V-shaped structures on the inclined surface 11b are extended to the first spaced region 11c.

Figure 3:
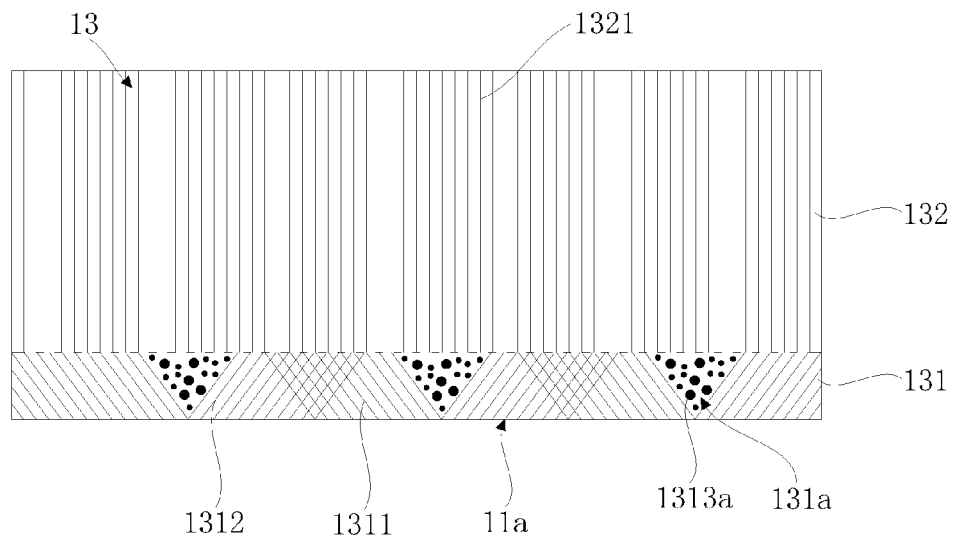
FIG. 3 is a bottom view of a light guide plate according to an embodiment of the present invention.

FIG. 3 is a bottom view of a light guide plate according to an embodiment of the present invention. With reference to FIG. 3, the light guide plate 10 of the present embodiment further has a reflection surface 13. The reflection surface 13 includes a first surface 131 connected with the light incident surface 11 and a second surface 132 connected with the first surface 131. The first surface 131 is provided with multiple second inclined V-shaped structures arranged at intervals. The second surface 132 is provided with multiple second vertical V-shaped structures.

In the present embodiment, the first surface 131 is a bottom surface of the wedge-shaped body 10b. The second surface 132 is a bottom surface of the plate body 10a. That is, in a top view or a bottom view of the light guide plate 10, the first surface 131 and the inclined surface 11b are overlapped, and the second surface 132 and the light emitting surface 12 are overlapped. In FIG. 3, the first surface 131 and the second surface 132 utilize a dotted line as a boundary line.

The second inclined V-shaped structure formed on the first surface 131 includes multiple fourth protrusion blocks 1311 extended along a first direction, and multiple fifth protrusion blocks 1312 extended along a second direction.

The second vertical V-shaped structure formed on the second surface 132 includes multiple sixth protrusion blocks 1321 extended along a third direction.

In addition, the second spaced region 131a located between the second inclined V-shaped structures on the first surface 131 is provided with multiple first dots 1313a. In the present embodiment, the first dots 1313a are black ink dots. Besides, in a top view or a bottom view of the light guide plate 10, the first spaced region 11c and the second spaced region 131a are overlapped. An installation position of the first inclined V-shaped structures is corresponded to an installation position of the second inclined V-shaped structures. An installation position of the first vertical V-shape structure is corresponded to an installation position of the second vertical V-shape structure. However, the present invention is not limited. For example, the installation positions may not be corresponded.

Figure 4:
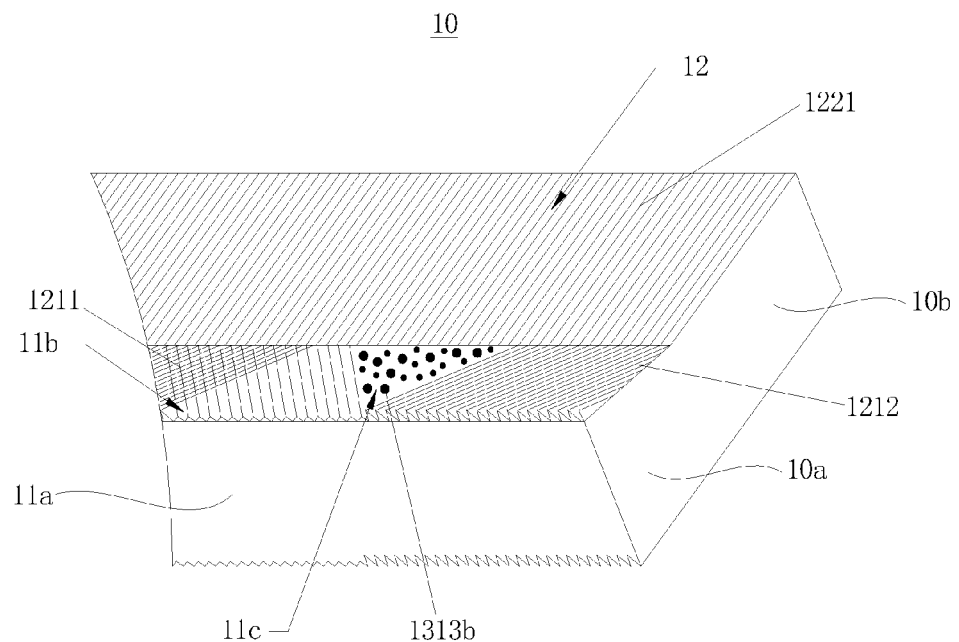
FIG. 4 is a partial three-dimensional view of a light guide plate according to another embodiment of the present invention.
Figure 5:
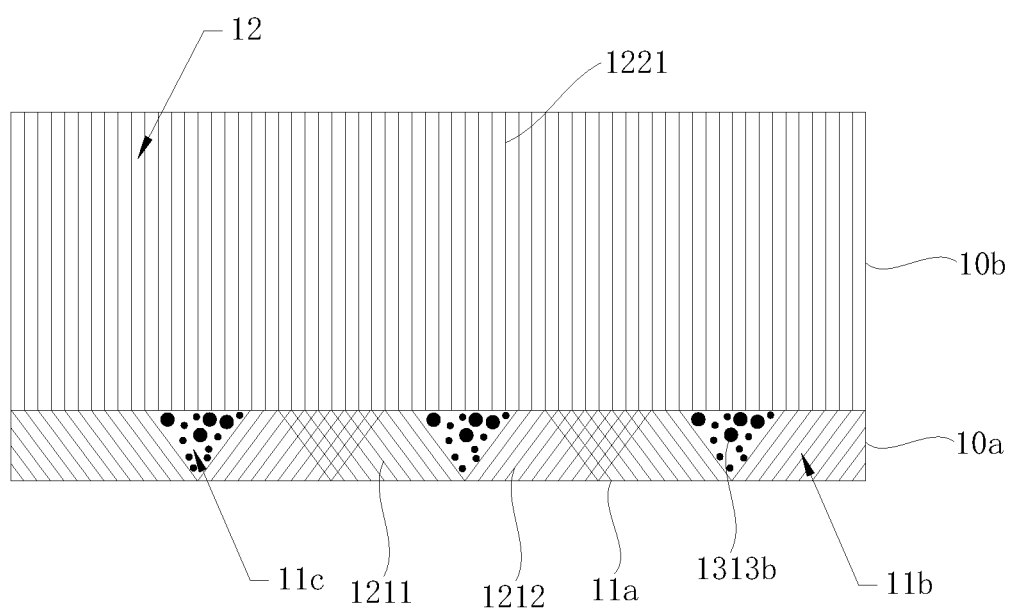
FIG. 5 is a top view of a light guide plate according to another embodiment of the present invention.

FIG. 4 is a partial three-dimensional view of a light guide plate according to another embodiment of the present invention. FIG. 5 is a top view of a light guide plate according to another embodiment of the present invention. The following content only illustrates the difference between the present embodiment and the light guide plate shown in FIG. 1 to FIG. 3. The same portions of the present embodiment and the light guide plate shown in FIG. 1 to FIG. 3 are not repeated.

With reference to FIG. 4 and FIG. 5, the difference between a light guide plate 10 according to the present embodiment and the light guide plate 10 shown in FIG. 1 to FIG. 3 is that in the present embodiment, multiple second dots 1313b are formed on the first spaced region 11c located between the first inclined V-shaped structures on the inclined surface 11b. In the present embodiment, the second dots 1313b can be black ink dots. However, the present invention is not limited.

Figure 6:
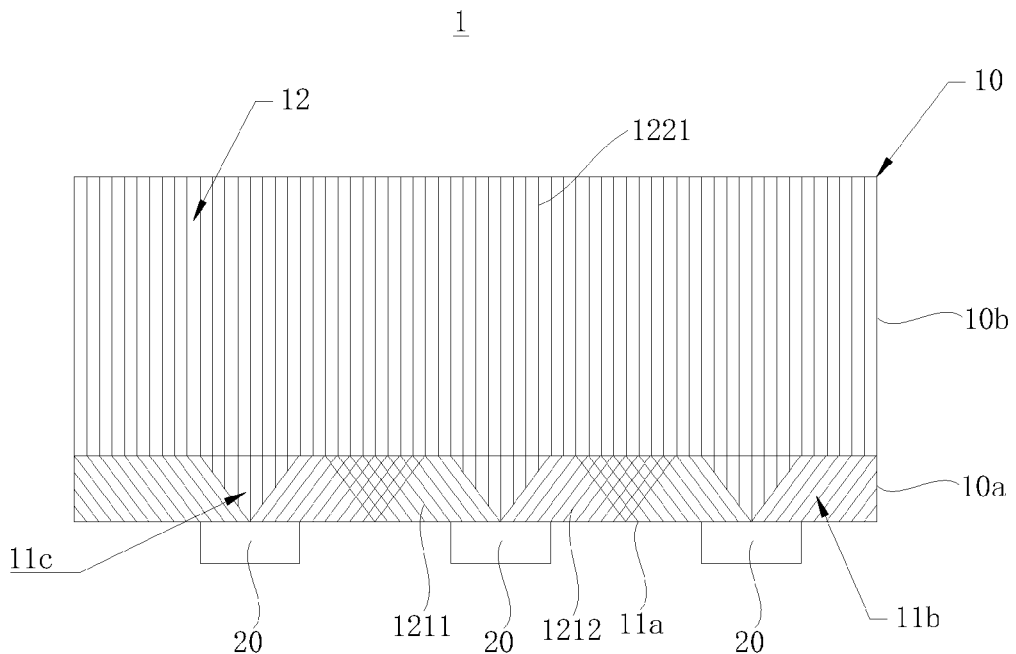
FIG. 6 is a top view of a side-light type backlight module according to an embodiment of the present invention.

FIG. 6 is a top view of a side-light type backlight module according to an embodiment of the present invention.

With reference to FIG. 6, the side-light type backlight module 1 of the present embodiment includes a light guide plate 10 shown in FIG. 1 to FIG. 3 and multiple light sources 20. Each light source 20 is closely contacted with the light incident surface 11, and correspondingly located between two first inclined V-shaped structures. In addition, each light source 20 is right opposite to the first spaced region 11c (or the second spaced region 131a) corresponding to and located between two first inclined V-shaped structures (or two second inclined V-shaped structures). It can be understood that, in the side-light backlight module 1 according to the embodiment of the present invention, the light guide plate 10 shown in FIG. 1 to FIG. 3 can be replaced by the light guide plate 10 shown in FIG. 4 to FIG. 5.

It should be noted that, the side-light type backlight module according to the embodiment of the present invention should include a back frame, a plastic frame, optical films or other necessary optical structures. Because the above elements are disclosed in the conventional art. They are not repeated again.

In addition, in the present embodiment, the light source 20 can be a point light source such as a Light-Emitting Diode (LED). The lights of the light source 20 enter into the light guide plate 10 through the light incident surface 11, being converted into a surface light source and emitted out from the light emitting surface 12.

According to the embodiments of the present invention, the inclined surface 11b is provided with a first inclined V-shaped structure, and the first surface 131 of the reflection surface 13 is provided with a second inclined V-shaped structure. The light source is disposed right oppositely to the first spaced region 11c (or the second spaced region 131a) located between two corresponding first inclined V-shaped structures (or two corresponding second V-shaped structures). By above way, the lights emitted from the light source 20 can be evenly distributed by the first inclined V-shaped structures and the second inclined V-shaped structures. At the same time, black ink dots are provided at the second spaced region 131a located between the second V-shaped structures so as to increase the light intensity at a front emitting region of the light source 20. Accordingly, an uneven light and dark phenomenon generated on the inclined surface 11b can be eliminated.

Figure 7:
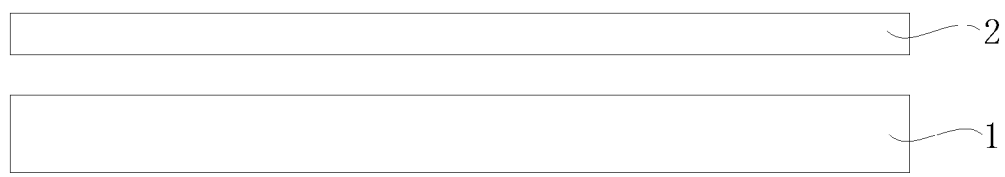
FIG. 7 is a schematic structure diagram of a liquid crystal display according to an embodiment of the present invention.

FIG. 7 is a schematic structure diagram of a liquid crystal display according to an embodiment of the present invention. A liquid crystal display according to an embodiment of the present invention includes a liquid crystal panel 2 and a side-light type backlight module 1 shown in FIG. 6 disposed oppositely to the liquid crystal panel 2. Wherein, the side-light type backlight module 1 provides a display light source to the liquid crystal panel 2 such that the liquid crystal panel 2 can display an image. In the present embodiment, the specific structure of the liquid crystal panel 2 is not described in detail. One person skilled in the art can refer to public structure of a liquid crystal panel in the conventional art.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A light guide plate, comprising:
a plate body having a top surface functioned as a light emitting surface, and a second bottom surface; and
a wedge-shaped body having an inclined surface, and extended upward along a terminal of the plate body, and wherein the wedge-shaped body further includes a first bottom surface disposed opposite to the inclined surface, a first terminal surface functioned as a light incident surface, and a second terminal surface disposed opposite to the first terminal surface and connected with the plate body;
wherein, the top surface of the plate body is connected smoothly with the inclined surface of the wedge-shaped body;
wherein, the inclined surface is provided with multiple first protrusion blocks arranged at intervals and extended along a first direction, multiple second protrusion blocks arranged at intervals and extended along a second direction, and a first spaced region disposed between the multiple first protrusion blocks and the multiple second protrusion blocks;
wherein, the top surface is provided with multiple third protrusion blocks extended along a third direction; and
wherein, the third direction is a symmetric axis of the first direction and the second direction.

2. The light guide plate according to claim 1, wherein, the third protrusion blocks corresponding to the first spaced region are extended to the first spaced region, and the first spaced region is triangular.

3. The light guide plate according to claim 1, wherein, a first spaced region is provided with multiple second black ink dots, and the first spaced region is triangular.

4. The light guide plate according to claim 1, wherein, the first bottom surface of the wedge-shaped body has multiple fourth protrusion blocks arranged at intervals and extended along the first direction, multiple fifth protrusion blocks arranged at intervals and extended along the second direction, and a second spaced region disposed between the multiple fourth protrusion blocks and the multiple fifth protrusion blocks, and the second bottom surface of the plate body has multiple sixth protrusion blocks arranged at intervals and extended along the third direction;
wherein, the second spaced region and the first spaced region are completely overlapped.

5. The light guide plate according to claim 4, wherein, the second spaced region is provided with multiple first dots, and the second spaced region is triangular; and
wherein, the third protrusion blocks corresponding to the first spaced region are extended to the first spaced region, and the first spaced region is triangular.

6. A backlight module, comprising:
a light source; and
a light guide plate, including:
a plate body having a top surface functioned as a light emitting surface, and a second bottom surface;
a wedge-shaped body having an inclined surface, and extended upward along a terminal of the plate body, and wherein the wedge-shaped body further includes a first bottom surface disposed opposite to the inclined surface, a first terminal surface functioned as a light incident surface, and a second terminal surface disposed opposite to the first terminal surface and connected with the plate body;
wherein, the top surface of the plate body is connected smoothly with the inclined surface of the wedge-shaped body;
wherein, the inclined surface is provided with multiple first protrusion blocks arranged at intervals and extended along a first direction, multiple second protrusion blocks arranged at intervals and extended along a second direction, and a first spaced region disposed between the multiple first protrusion blocks and the multiple second protrusion blocks;
wherein, the top surface is provided with multiple third protrusion blocks extended along a third direction;
wherein, the first bottom surface of the wedge-shaped body has multiple fourth protrusion blocks arranged at intervals and extended along the first direction, multiple fifth protrusion blocks arranged at intervals and extended along the second direction, and a second spaced region disposed between the multiple fourth protrusion blocks and the multiple fifth protrusion blocks, and the second bottom surface of the plate body has multiple sixth protrusion blocks arranged at intervals and extended along the third direction;
wherein, the third direction is a symmetric axis of the first direction and the second direction; and
wherein, the light source is right opposite to the first spaced region.

7. The backlight module according to claim 6, wherein, the third protrusion blocks corresponding to the first spaced region are extended to the first spaced region.

8. The backlight module according to claim 6, wherein, a first spaced region is provided with multiple second black ink dots, and the first spaced region is triangular.

9. The backlight module according to claim 6, wherein, the second spaced region is provided with multiple first dots, and the second spaced region is triangular;

wherein, the third protrusion blocks corresponding to the first spaced region are extended to the first spaced region, and the first spaced region is triangular; and wherein, the second spaced region and the first spaced region are completely overlapped.

\* \* \* \* \*